Aug. 22, 1933.  A. MOELLER  1,923,789
REENFORCEMENT FOR HAND BASKETS
Filed June 8, 1931
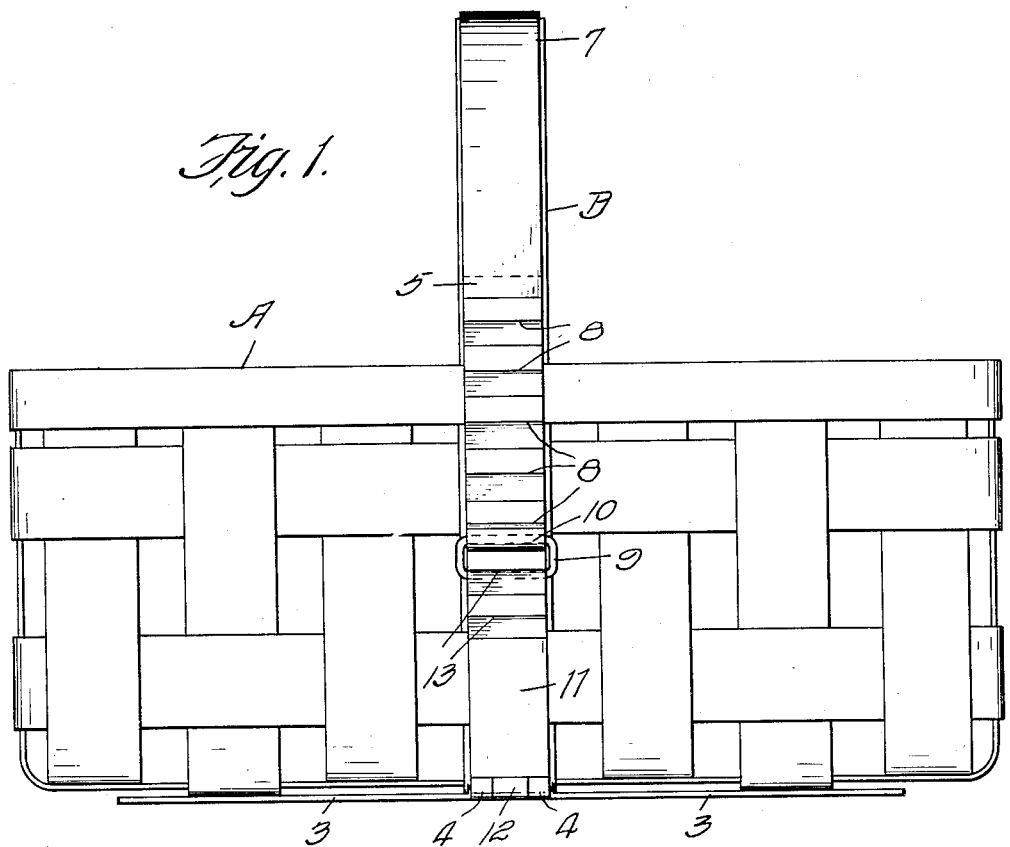
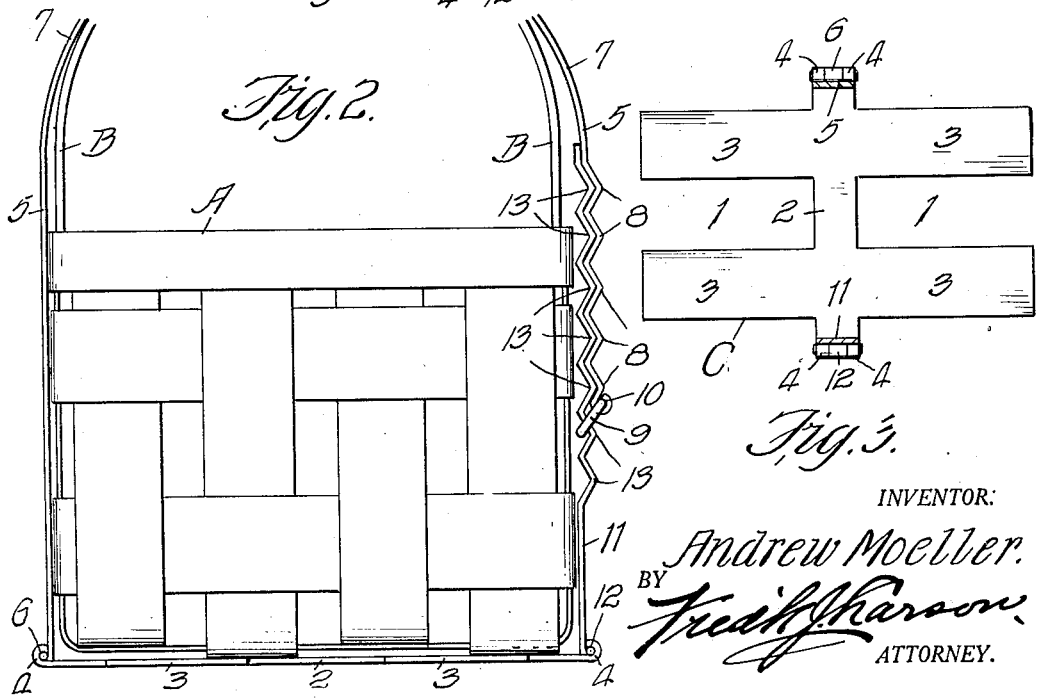
INVENTOR:
Andrew Moeller.
BY Fred J. Harson
ATTORNEY.

Patented Aug. 22, 1933

1,923,789

UNITED STATES PATENT OFFICE 1,923,789

REENFORCEMENT FOR HAND BASKETS

Andrew Moeller, Creve Coeur, Mo.

Application June 8, 1931. Serial No. 542,724

9 Claims. (Cl. 217—125)

This invention relates to means adapted to be applied to market baskets and has for its object to provide a reenforcement for both the handle and the bottom of the basket to prevent breaking of the handle and bottom thereof, regardless of the weight of the load carried in the basket.

A further object of the invention resides in the provision of a device which can be readily applied to, and removed from a basket and which is applicable to baskets that vary in sizes, both of body and handle therefor.

A still further object of the invention is the provision of reenforcement for hand baskets which possesses advantages in points of simplicity and efficiency, and, at the same time proves itself comparatively inexpensive in cost of manufacture.

With the above and other objects in view, the invention consists in the novel features of construction, and arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a side elevation of a basket with means embodying the feature of my invention applied thereto.

Fig. 2 is an end elevation of a basket with my invention applied thereto, the handle of the basket and handle of the reenforcement being shown as partly broken away.

Fig. 3 is a sectional view of the device taken on a line above the base thereof.

Referring to the drawing, the reference character A designates a market basket, known as the "split type", and B, designates the wooden handle thereof.

In carrying out the aim of my invention, I employ a flat sheet metal plate designated generally, as C, and which is provided with the opposed longitudinal cutouts 1 to provide the plate with a transverse portion 2 uniting two longitudinal parallel arranged portions 3 midway therein, thus forming an H-shaped plate, or support for the bottom of the basket A.

A pair of ears 4 are directed outwardly from the outer longitudinal edges of the plate portions 3. The lower end of a metallic strap handle member 5 is hingedly connected, as at 6 to one of the ears 4. The handle member 5 has its upper portion curved, or arched, as at 7 and adapted for engagement with the outer face of the basket handle B. The opposite or free end of the handle member 5 extends downwardly a suitable distance below the upper edge of the basket A, as clearly shown in Fig. 2 and it is provided with a plurality of transverse corrugations 8. The lower edge of the free end of the handle member 5 is provided with an elongated lock ring 9 which is swingingly supported, as at 10.

A relatively short metallic strap handle member 11 is hingedly connected at its lower end, as at 12, to the outer end of the other ear 4 of the bottom plate C, as clearly shown in Figs. 1 and 2. The upper portion of the handle member 11, which passes through the ring 9, is corrugated, as at 13 to correspond to the corrugations 8 of the free end of the handle member 5, as will be apparent from Fig. 2.

It will be noted that the corrugated free end of the handle member 5 is adapted to overlap and engage the outer face of the corrugated portion of the handle member 11, when the device is applied to a basket for reenforcing both the handle and the bottom of the basket, and, that the ring member 9 is adapted to engage one of the corrugations of the handle member 11 for locking the handle of the device in contact with the outer face of the basket handle so that the H-shaped plate C will support the major portion of the bottom of the basket, as shown in Figs. 1 and 2 of the drawing.

It will be apparent that the corrugations of the two handle members permit of the handle being lengthened, or shortened, as the size of the basket may require, and, also act as anti-slip means when the corrugated portions of the handle members are in contact with each other.

In operation, the handle members are first disconnected and are allowed to swing from their two hinge points. When the handle is lengthened by slipping the ring 9 toward the upper corrugations of the handle member 5, the basket is seated upon the H-shaped plate or support C and then the curved portion 7 of the handle member 5 is moved into contact with the handle B of the basket A by moving the ring 9 of handle member 5 downwardly as far as it will go. When the ring has been moved to its furthermost downward position, its lower portion is moved outwardly to engage in the corrugation of the handle member 11 next below the hinge point 10 of the ring 9. The handle of the basket reenforcement device is then in its locked position relative to the handle member 11 and the basket can be carried by means of the basket handle, reenforced by the handle of the plate C, which plate supports the bottom of the basket and prevents it from sagging or breaking when a load is carried in the basket. The handle of the device prevents the handle of the basket from breaking, as it relieves the basket handle of any strain imparted thereto. The reenforcement means is readily removed from the basket after moving the ring 9 upwardly along the corrugated portion of handle member 11.

The device, it will be observed, is a protection to the mid-section of the sides of the basket to prevent bulging thereof, as well as to the handle and the major portion of the bottom of the basket.

It will also be apparent that the device can be readily applied to a basket having a broken bottom, or broken handle, or both, as it will afford sufficient reenforcement therefor to permit it being filled with a load and carried, due to the use of the plate which supports the major portion of the bottom of the basket, and in that the basket can be carried by the handle of the device, if the handle of the basket is too badly broken, or even if a section thereof is missing.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination with a basket and the handle thereof, a plate upon which the major portion of the bottom of the basket is adapted to rest, a short handle member hingedly connected to one of the side edges of the plate, a relatively longer handle member hingedly connected to the opposite side edge of the plate, said handle members adapted to overlap one another on one side of the basket and means for detachably connecting the handle members.

2. In combination with a basket and the handle thereof, a plate upon which the major portion of the bottom of the basket is adapted to rest, a short handle member hingedly connected to one of the side edges of the plate, a relatively longer handle member hingedly connected to the opposite side edge of the plate, said handle members being provided with corrugated portions adapted to overlap and engage each other and a lock ring carried by the free end of one of the handle members and adapted for engagement with one of the corrugations of the other handle member.

3. In combination with a basket and the handle thereof, an H-shaped plate upon which the major portion of the bottom of the basket is adapted to rest, a pair of strap handle members hingedly connected at their lower ends to the side edges of the plate midway its ends, one of said handle members being relatively longer than the other handle member and provided with an arched portion, the end portion of which is adapted to overlap the other handle member on one side of the basket and means for detachably locking the handle members together so that the arched portions of the one handle member will be in engagement with the outer face of the handle of the basket.

4. In a device of the class described, a base member, lateral extensions on said base member, a short strap member hinged at one end to one of said base extensions, transverse corrugations formed on said strap member, a relatively long strap hingedly connected at one end to the other of said base extensions, transverse corrugations formed on the free end portion of said latter strap and an elongated loop hingedly connected to the free end of said long strap through which the free end of the short strap passes when connecting the two strap members with their superimposed corrugated ends in nested relation.

5. In a device of the class described, a base plate, a short straight strap having corrugated surfaces, means for hingedly connecting said strap to the side edge of said base plate, a relatively long strap having corrugated surfaces, means for hingedly connecting said strap to the other side edge of the base plate and an elongated loop hingedly connected to the free extremity of the relatively long strap.

6. In a device of the class described, a metallic base member, a pair of strap members hingedly connected at their one end to the side edges of the base member, transverse corrugations formed on each of the strap members for nested engagement when the strap members are connected in superimposed relation, an elongated loop hingedly connected to the free extremity of one of the strap members through which the free end of the other strap member passes when the strap members are in nested relation and said loop serving as a locking means to prevent accidental separation of the nested ends of the strap members by engaging in one of the corrugations of one of the strap members.

7. In combination with a basket and the handle thereof, a plate upon which the major portion of the bottom of the basket is adapted to rest, a short handle member having a corrugated portion hingedly connected at one end to one of the side edges of the plate, a relatively longer handle member having a corrugated portion hingedly connected at one end to the opposite side edge of the plate, the corrugated portions of said handle members when superimposed adapted to nest with one another on one side of the basket and handle thereof and an elongated ring carried by one of the handle members for contact with a selected corrugation of the other handle member for detachably connecting the handle members.

8. In a tie device wherein the ends thereof are adapted to overlap, transverse corrugations formed along a portion of each end of the device and adapted to lie in superimposed adjustable nested relation and a loop clasp hingedly carried at the extremity of one end of the device through which the other end of the device passes so that the loop clasp will engage in one of the corrugations on the end of the device passing through the loop clasp to prevent separation of the superimposed ends of the device in the adjusted nested relation.

9. In combination, a plurality of members hingedly connected with two of the members having their free ends transversely corrugated so that they may be superimposed in adjusted nested relation and a loop clasp hingedly carried on the free extremity of one end of the corrugated members through which the other corrugated member passes with the loop clasp engaging one of the corrugations of the member passing through the loop clasp.

ANDREW MOELLER.